United States Patent [19]
Hattori

[11] Patent Number: 5,386,530
[45] Date of Patent: Jan. 31, 1995

[54] ADDRESS TRANSLATION DEVICE CAPABLE OF OBTAINING A REAL ADDRESS FROM A VIRTUAL ADDRESS IN A SHORTER TIME

[75] Inventor: Toshiyuki Hattori, Tokyo, Japan

[73] Assignee: NEC Corporation, Tokyo, Japan

[21] Appl. No.: 889,908

[22] Filed: May 29, 1992

[30] Foreign Application Priority Data

May 31, 1991 [JP] Japan ................... 3-155361

[51] Int. Cl.⁶ .................... G06F 12/08; G06F 12/10
[52] U.S. Cl. ................... 395/400; 364/DIG. 1; 364/243; 364/243.4; 364/243.41; 364/243.45; 364/247.2; 364/256.3; 364/256.4
[58] Field of Search ................... 395/400, 425

[56] References Cited

U.S. PATENT DOCUMENTS

| | | | |
|---|---|---|---|
| 3,761,881 | 9/1973 | Anderson et al. | 395/400 |
| 5,179,680 | 1/1993 | Colwell et al. | 395/425 |
| 5,226,133 | 7/1993 | Taylor et al. | 395/400 |
| 5,305,444 | 4/1994 | Becker et al. | 395/400 |

FOREIGN PATENT DOCUMENTS 0250952  1/1988  European Pat. Off. .

OTHER PUBLICATIONS

IBM Technical Disclosure Bulletin, Ngai et al. "Two-- Level DLAT Hierarchy" vol. 24, pp. 4714–4715, (1982).

A. Khan, "CMOS and ECL Implementation Of MIPS. RISC Architecture," *Microprocessors and Microsystems*, vol. 14:367–375, (1990).

*Primary Examiner*—Jack B. Harvey
*Assistant Examiner*—Michael A. Whitfield
*Attorney, Agent, or Firm*—Foley & Lardner

[57] ABSTRACT

In an address translation device having a main address translation unit (20) with a main access time that translates an input virtual address into a main real address, a subsidiary address translation unit (30) is connected to the main address translation unit (20). The subsidiary address translation unit (30) has a subsidiary access time shorter than the main access time and translates the input virtual address into a subsidiary real address. Connected to the main address translation unit (20) and the subsidiary address translation unit (30), an output address production unit (40) selectively produces one of the main real address and the subsidiary real address as an output real address. The subsidiary address translation unit (30) has an access/real address register (31) holding a buffer access address of the input virtual address and the main real address as a held access address and a held real address, respectively.

28 Claims, 6 Drawing Sheets

ADDRESS TRANSLATION DEVICE CAPABLE OF OBTAINING A REAL ADDRESS FROM A VIRTUAL ADDRESS IN A SHORTER TIME

BACKGROUND OF THE INVENTION

This invention relates to an address translation device for use in combination with a main storage of an information processing system in translating an input virtual address into an output real address.

Such an address translation device is disclosed in U.S. Pat. No. 3,761,881 issued to Anderson et al. In order to make several computer programs, executed either by a single central processing unit or by a plurality of processing units, share one memory, an information processing system is provided with a virtual storage having an extremely large storage capacity which is often more than that of an actual main storage. The virtual storage is divided into virtual pages with each virtual page consisting of a predetermined number of bytes, while the main storage is divided into real pages with each real page consisting of the predetermined number of bytes. The virtual pages are located randomly into the real pages. The virtual pages and the real pages can be exchanged with each other if necessary. Random location of pages necessitates the construction of a page table that reflect the actual or real location of each page. The page table is maintained in the main storage and is utilized in translating an input virtual address into an output real address of the required page.

However, the main storage is frequently referenced whenever address translation of a virtual address into a real address is carried out to read the requested data in the main storage.

In order to solve such a problem, an address translation device comprises an address translation buffer in the central processing unit that may be called a Translation Lookaside Buffer (TLB). More specifically, the address translation buffer memorizes a plurality of virtual addresses and a plurality of real addresses corresponding to the respective virtual addresses. A predetermined part of the input virtual address is supplied to the address translation buffer as a buffer access address. If the address translation buffer contains a particular one of the real addresses that corresponds to the input virtual address, the address translation buffer produces the particular real address as the output real address from the buffer access address. The output real address is used for accessing the main storage. The central processing system may include a buffer storage which may be called a cache storage. In this case, the output real address is sent to the buffer storage.

If the address translation buffer does not contain any one of the real addresses that corresponds to the input virtual address, then the input virtual address is passed on to the main storage and address translation of the input virtual address into the output real address is performed with reference to the page table. Subsequently, the output real address is stored in the address translation buffer together with the input virtual address. Accordingly, the address translation buffer can produce the output real address when the address translation buffer is supplied with the same buffer access address once more again. This is because the address translation buffer already contains the particular real address that corresponds to the input virtual address.

A conventional address translation device comprises a virtual address register, the address translation buffer, and a virtual address comparator. The virtual address register holds, as a held virtual address, the input virtual address supplied from an execution processing unit in the central processing unit. The held virtual address is divided into first and second fields which occupy upper and lower bits thereof, respectively. The second field of the held virtual address is supplied to the address translation buffer as the buffer access address. The address translation buffer stores buffer fields of virtual addresses and real addresses corresponding to the respective virtual addresses. Each of the buffer fields of the virtual addresses corresponds to the first field of the held virtual address. Therefore, responsive to the buffer access address, the address translation buffer produces, as an output buffer field of the virtual address and the output real address, one of the buffer fields of the virtual addresses and one of the buffer real addresses, respectively, that are stored in the buffer access address.

The output buffer field of the virtual address is supplied to the virtual address comparator from the address translation buffer. The virtual address comparator is also supplied with the first field of the held virtual address from the virtual address register. The virtual address comparator compares the first field of the held virtual address with the output buffer field of the virtual address to determine whether or not translation pair corresponding to the input virtual address is stored in the address translation buffer. The virtual address comparator produces a virtual address coincidence signal when the first field of the held virtual address coincides with the output buffer field of the virtual address. When the virtual address comparator produces the virtual address coincidence signal, the address translation buffer produces the output real address which is correctly translated. The main storage is accessed by the output real address.

In general, the address translation buffer is composed by a memory having a large buffer capacity and a relatively longer buffer access time. As a result, the conventional address translation device is defective in that the address translation of the input virtual address into the output virtual address wastes a translation time longer than the buffer access time. That is, the conventional address translation device results in degradation of performance of the information processing system.

SUMMARY OF THE INVENTION

It is therefore an object of this invention to provide an address translation device which is capable of obtaining an output real address at a shorter time.

It is another object of this invention to provide an address translation device of the type described, which is capable of quickly performing an address translation with addition of little hardware.

Other objects of this invention will become clear as the description proceeds.

On describing the gist of an aspect of this invention, it is possible to understand that an address translation device for translating an input virtual address into an output real address.

According to this invention, the above-understood address translation device comprises main address translation means supplied with the input virtual address and having a main access time for translating the input virtual address into a main real address. Connected to the main address translation means, subsidiary address translation means supplied with the input virtual address and having a subsidiary access time shorter than the main access time translate the input virtual address into a subsidiary real address. Connected to the main address translation means and the subsidiary address translation means, producing means selectively produces one of the main real address and the subsidiary real address as the output real address.

According to a first aspect of this invention, the above-understood address translation device comprises a virtual address register for holding the input virtual address as a held virtual address which is divided into first and second fields. Connected to the virtual address register, an address translation buffer has a buffer capacity and a buffer access time and stores buffer fields of virtual addresses and buffer real addresses corresponding to the respective virtual addresses. Each of the buffer fields of the virtual addresses corresponds to the first field of the held virtual address. The address translation buffer is accessed by the second field of the held virtual address as a buffer access address to produce, as an output buffer field of the virtual address and an output buffer real address, one of the buffer fields of the virtual addresses and one of the buffer real addresses, respectively, that are stored in the buffer access address. Connected to the virtual address register and the address translation buffer, a virtual address comparator compares the first field of the held virtual address with the output buffer field of the virtual address. The virtual address comparator produces a virtual address coincidence signal when the first field of the held virtual address coincides with the output buffer field of the virtual address. Connected to the virtual address register and the address translation buffer, an access/real address register has a register capacity smaller than the buffer capacity and a register access time shorter than the buffer access time. Responsive to a buffer presence/register absence signal, the access/real address register holds the buffer access address and the output buffer real address as a held access address and a held real address, respectively. The access/real address register produces the held access address and the held real address as an output register access address and the output real address, respectively. Connected to the virtual address register and the access/real address register, a register access address comparator compares the buffer access address with the output register access address. The register access address comparator produces a register access address coincidence signal when the buffer access address coincides with the output register access address. Connected to the virtual address comparator and the register access address comparator, first detection means detects, in response to the virtual address coincidence signal and the register access address coincidence signal, whether the held real address corresponding to the input virtual address is present or absent in the access/real address register. The first detection means produces a register presence signal indicative of presence in the access/real address register when both of the virtual address coincidence signal and the register access address coincidence signal are supplied thereto. Connected to the virtual address comparator, the register access address comparator, and the access/real address register, second detection means detects, in response to the virtual address coincidence signal and the register access address coincidence signal, that the buffer real address corresponding to the input virtual address is present in the address translation buffer and that the held real address corresponding to the input virtual address is absent in the access/real address register. The second detection means produces the buffer presence/register absence signal indicative of presence in the address translation buffer and of absence in the access/real address register when the virtual address coincidence signal is supplied thereto and when the register access address coincidence signal is not supplied thereto. The second detection means thereby makes the access/real address register hold the buffer access address and the output buffer real address in response to the buffer presence/register absence signal.

According to a second aspect of this invention, the afore-understood address translation device comprises a virtual address register for holding said input virtual address as a held virtual address which is divided into first and second fields. The second field is divided into first and second sub-fields. Connected to the virtual address register, an address translation buffer has a buffer capacity and a buffer access time and memorizes buffer fields of virtual addresses and buffer real addresses corresponding to the respective virtual addresses. Each of the buffer fields of the virtual addresses corresponds to the first field of held virtual address. The address translation buffer is accessed by the second field of the held virtual address as a buffer access address to produce, as an output buffer field of the virtual address and an output buffer real address, one of the buffer fields of the virtual addresses and one of the buffer real addresses, respectively, that are memorized in the buffer access address. Connected to the virtual address register and the address translation buffer, a virtual address comparator compares the first field of the held virtual address with the output buffer field of the virtual address. The virtual address comparator produces a virtual address coincidence signal when the first field of the held virtual address coincides with the output buffer field of the virtual address. Connected to the virtual address register and the address translation buffer, and access/real address sub-buffer has a sub-buffer capacity smaller than the buffer capacity and a sub-buffer access time shorter than the buffer access time. Responsive to a buffer presence/sub-buffer absence signal, the access/real address sub-buffer stores the first sub-field of the held virtual address and the output buffer real address in the second sub-field of the held virtual address as a stored access sub-address and a stored sub-buffer real address, respectively. The access/real address sub-buffer is accessed by the second sub-field of the held virtual address as a sub-buffer access address to produce, as an output sub-buffer access address and the output real address, the stored access sub-address and the stored sub-buffer real address, respectively, which are stored in the sub-buffer access address. Connected to the virtual address register and the access/real address sub-buffer, a sub-buffer access address comparator compares the first sub-field of the held virtual address with the output sub-buffer access address. The sub-buffer access address comparator produces a sub-buffer access address coincidence signal when the first sub-field of the held virtual address coincides with the output sub-buffer access address. Connected to the virtual address comparator and the sub-buffer access address comparator, first detection means detects, in response to the virtual address coincidence signal and the sub-buffer access address coincidence signal, whether the stored sub-buffer real address corresponding to the input virtual address is present or absent in the access/real address sub-buffer. The first detection means produces a sub-buffer presence signal indicative of presence in the access/real address sub-buffer when both of the virtual address coincidence signal and the sub-buffer access address coincidence signal are supplied thereto. Connected to the virtual address comparator, the sub-buffer access address comparator, and the access/real address sub-buffer, second detection means detects, in response to the virtual address coincidence signal and the sub-buffer access address coincidence signal, that the buffer real address corresponding to the input virtual address is present in the address translation buffer and that the stored sub-buffer real address corresponding to the input virtual address is absent in the access/real address sub-buffer. The second detection means produces the buffer presence/sub-buffer absence signal indicative of presence in the address translation buffer and of absence in the access/real address sub-buffer when the virtual address coincidence signal is supplied thereto and when the sub-buffer access address coincidence signal is not supplied thereto. The second detection means thereby makes the access/real address sub-buffer hold the first sub-field of the held virtual address and the output buffer real address in response to the buffer presence/absence signal.

According to a third aspect of this invention, the above-understood address translation device comprises a virtual address register for holding the input virtual address as a held virtual address which is divided into first and second fields. The second field is divided into first and second sub-fields. Connected to the virtual address register, an address translation buffer has a buffer capacity and a buffer access time and stores buffer fields of virtual addresses and buffer real addresses corresponding to the respective virtual addresses. Each of the buffer fields of the virtual addresses corresponds to the first field of the held virtual address. The address translation buffer is accessed by the second field of the held virtual address as a buffer access address to produce, as an output buffer field of the virtual address and an output buffer real address, one of the buffer fields of the virtual addresses and one of the buffer real addresses, respectively, that are stored in the buffer access address. Connected to the virtual address register and the address translation buffer, a virtual address comparator compares the first field of the held virtual address with the output buffer field of the virtual address. The virtual address comparator produces a virtual address coincidence signal when the first field of the held virtual address coincides with the output buffer field of the virtual address. Connected to the virtual address register and the address translation buffer, an access/real address sub-buffer has a sub-buffer capacity smaller than the buffer capacity and a sub-buffer access time shorter than the buffer access time. Responsive to a buffer presence/sub-buffer absence/register absence signal, the access/real address sub-buffer stores the first sub-field of the held virtual address and the output buffer real address in the second sub-field of the held virtual address as a stored access sub-address and a stored sub-buffer real address, respectively. The access/real address sub-buffer is accessed by the second sub-field of the held virtual address as a sub-buffer access address to produce, as an output sub-buffer access address and an output sub-buffer real address, the stored access sub-address and the stored sub-buffer real address, respectively, which are stored in the sub-buffer access address. Connected to the virtual address register and the access/real address sub-buffer, a sub-buffer access address comparator compares the first sub-field of the held virtual address with the output sub-buffer access address. The sub-buffer access address comparator produces a sub-buffer access address coincidence signal when the first sub-field of the held virtual address coincides with the output sub-buffer access address. Connected to the virtual address register and the access/real address sub-buffer, an access/real address register has a register capacity smaller than the buffer capacity and a register access time shorter than the buffer access time. Responsive to the buffer presence/sub-buffer absence/register absence signal, the access/real address register holds a combination of the output sub-buffer access address and the sub-buffer access address and the output sub-buffer real address as a held access address and a held real address, respectively. The access/real address register produces the held access address and the held real address as an output register access address and an output register real address, respectively. Connected to the virtual address register and the access/real address register, a register access address comparator compares the buffer access address with the output register access address. The register access address comparator produces a register access address coincidence signal when the buffer access address coincides with the output register access address. Connected to the access/real address sub-buffer, the access/real address register, and the first access address comparator, a real address selector selects, in response to the sub-buffer access address coincidence signal, one of the output sub-buffer real address and the output register real address as the output real address. Connected to the virtual address comparator and the sub-buffer and said register access address comparators, first detection means detects, in response to the virtual address coincidence signal and the sub-buffer and the register access address coincidence signals, that either the stored sub-buffer real address corresponding to the input virtual address is present in the access/real address sub-buffer or the held real address corresponding to the input virtual address is present in the access/real address register. The first detection means produces a sub-buffer presence/register presence signal indicative of either presence in the access/real address sub-buffer or presence in the access/real address register when the virtual access address coincidence signal is supplied thereto and when selected at least one of the sub-buffer and the register access address coincidence signals are supplied thereto. Connected to the virtual address comparator, the sub-buffer and the register access address comparators, the access/real address sub-buffer, and the access/real address register, second detection means detects, in response to the virtual address coincidence signal and the sub-buffer and the register access address coincidence signals, that the buffer real address corresponding to the input virtual address is present in the address translation buffer and that both of the stored sub-buffer real address and the held real address corresponding to the input virtual address are absent in both of the access/real address sub-buffer and the access/real address register. The second detection means produces the buffer presence/sub-buffer absence/register absence signal indicative of presence in the address translation buffer and of absence in both of the access real address sub-buffer and the access/real address register when the virtual address coincidence signal is supplied thereto and when both of the sub-buffer and the register access address coincidence signals are not supplied thereto.

The second detection means thereby makes the access/-real address sub-buffer store the first sub-field of the held virtual address and the output buffer real address in response to the buffer presence/sub-buffer absence/register absence signal and makes the access/real address register hold the output sub-buffer access address, the sub-buffer access address, and the output sub-buffer real address in response to the buffer presence/sub-buffer absence/register absence signal.

Instead of the real address selector, the above-understood address translation device in the third aspect of this invention may comprise another real address selector connected to the access/real address sub-buffer, the access/real address register, and the register access address comparator for selecting, in response to the register access address coincidence signal, one of the output sub-buffer real address and the output register real address as the output real address.

According to a fourth aspect of this invention, the afore-understood address translation device comprising a virtual address register for holding the input virtual address as a held virtual address which is divided into first and second fields. The second field is divided into first and second sub-fields. Connected to the virtual address register, an address translation buffer has a buffer capacity and a buffer access time and memorizes buffer fields of virtual addresses and buffer real addresses corresponding to the respective virtual addresses. Each of the buffer fields of the virtual addresses corresponds to the first field of the held virtual address. The address translation buffer is accessed by the second field of the held virtual address as a buffer access address to produce, as an output buffer field of the virtual address and an output buffer real address, one of the buffer fields of the virtual addresses and one of the buffer real addresses, respectively, that are stored in the buffer access address. Connected to the virtual address register and the address translation buffer, a virtual address comparator compares the first field of the held virtual address with the output buffer field of the virtual address. The virtual address comparator produces a virtual address coincidence signal when the first field of the held virtual address coincides with the output buffer field of the virtual address. Connected to the virtual address register and the address translation buffer, an access/real address register has a register capacity smaller than the buffer capacity and a register access time shorter than the buffer access time. Responsive to a buffer presence/sub-buffer absence/register absence signal, the access/real address register holds the buffer access address and the output buffer real address as a held access address and a held real address, respectively. The held access address is divided into first and second held access sub-addresses. The access/real address register produces the held access address and the held real address as an output register access address and an output register real address, respectively. The access/real address register produces the first and the second held access sub-addresses as first and second output register access sub-addresses, respectively. Connected to the virtual address register and the access/real address register, a register access address comparator compares the buffer access address with the output register access address. The register access address comparator produces a register access address coincidence signal when the buffer access address coincides with the output register access address. Connected to the virtual address register and the access/real address register, an access address selector selects, in response to the buffer presence/sub-buffer absence/register absence signal, one of the second sub-field of the held virtual address and the second output register access sub-address as a sub-buffer access address. Connected to the virtual address register, the access/real address register, and the access address selector, an access/real address sub-buffer has a sub-buffer capacity smaller than the buffer capacity and a sub-buffer access time shorter than the buffer access time. Responsive to the buffer presence/sub-buffer absence/register absence signal, the access/real address sub-buffer stores the first output register access sub-address and the output register real address in the sub-buffer access address as a stored access sub-address and a stored sub-buffer real address, respectively. The access/real address sub-buffer is accessed by the sub-buffer access address to produce, as an output sub-buffer access address and an output sub-buffer real address, the stored access sub-address and the stored sub-buffer real address, respectively, which are stored in the sub-buffer access address. Connected to the virtual address register and the access/real address sub-buffer, a sub-buffer access address comparator compares the first sub-field of the held virtual address with the output sub-buffer access address. The sub-buffer access address comparator produces a sub-buffer access address coincidence signal when the first sub-field of the held virtual address coincides with the output sub-buffer access address. Connected to the access/real address sub-buffer, the access/real address register, and the register access address comparator, a real address selector selects, in response to the register access address coincidence signal, one of the output sub-buffer real address and the output register real address as the output real address. Connected to the virtual address comparator and the register and the sub-buffer access address comparators, first detection means detects, in response to the virtual address coincidence signal and the register and the sub-buffer access address coincidence signals, that either the stored sub-buffer real address corresponding to the input virtual address is present in the access/real address sub-buffer or the held real address corresponding to the input virtual address is present in the access/real address register. The first detection means produces a sub-buffer presence/register presence signal indicative of either presence in the access/real address sub-buffer or presence in the access/real address register when the virtual address coincidence signal is supplied thereto and when selected at least one of the register and the sub-buffer access address coincidence signals are supplied thereto. Connected to the virtual address comparator, the register and the sub-buffer access address comparators, the access/real address register, the access/-real address sub-buffer, and the access address selector, second detection means for detecting, in response to the virtual address coincidence signal and the register and the sub-buffer access address coincidence signals, that the buffer real address corresponding to the input virtual address is present in the address translation buffer and that both of the stored sub-buffer real address and the held real address corresponding to the input virtual address are absent in both of the access/real address register and the access/real address sub-buffer. The second detection means produces the buffer presence/-sub-buffer absence/register absence signal indicative of presence in the address translation buffer and of absence in both of the access/real address sub-buffer and the access/real address register when the virtual address coincidence signal is supplied thereto and when both of the register and the sub-buffer access address coincidence signals are not supplied thereto. The second detection means thereby makes the access address selector select the second output register access sub-address as the sub-buffer access address in response to the buffer presence/sub-buffer absence/register absence signal, makes the access/real address sub-buffer store the first output register access sub-address and the output register real address in the sub-buffer access address in response to the buffer presence/sub-buffer absence/register absence signal, and makes the access/real address register hold the buffer access address and the output buffer real address in response to the buffer presence/sub-buffer absence/register absence signal.

Instead of the real address selector, the afore-understood address translation device in the fourth aspect of this invention may comprise another real address selector connected to the access/real address sub-buffer, the access/real address register, and the sub-buffer access address comparator for selecting, in response to the sub-buffer access address coincidence signal, one of the output sub-buffer real address and the output register real address as the output real address.

DESCRIPTION OF THE PREFERRED EMBODIMENTS

Figure 1:
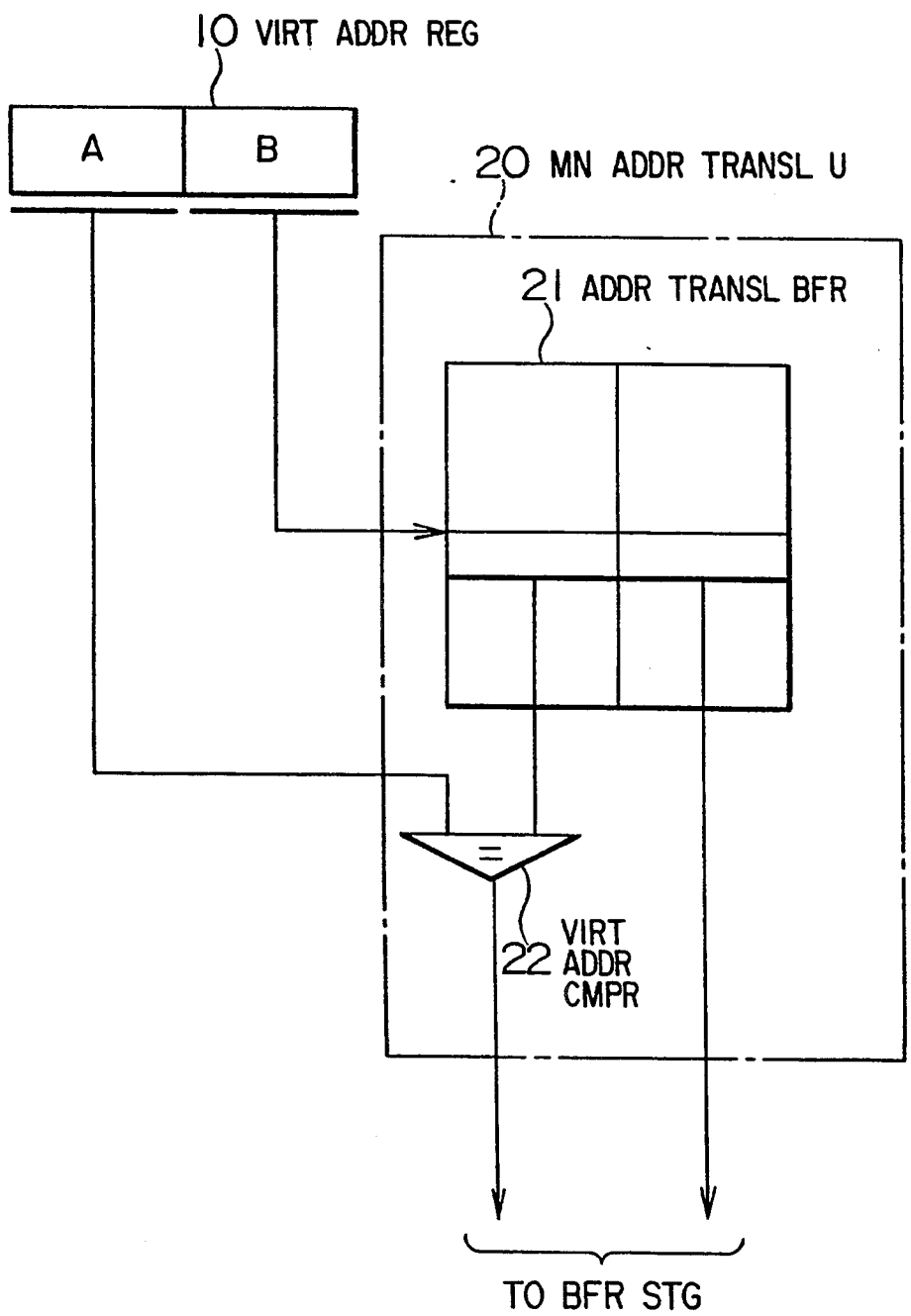
FIG. 1 is a block diagram of a conventional address translation device.

Referring to FIG. 1, a conventional address translation device will be described in order to facilitate an understanding of this invention. The conventional address translation device is for translating an input virtual address into an output real address.

The conventional address translation device comprises a virtual address register 10 and a main address translation unit 20. The virtual address register 10 holds the input virtual address as a held virtual address. The held virtual address is divided into first and second fields A and B which occupy upper and lower bits thereof, respectively.

The main address translation unit 20 is connected to the virtual address register 10. The main address translation unit 20 is supplied with the held virtual address. The main address translation unit 20 has a main access time. The main address translation unit 20 translates the held virtual address into a main real address. The main address translation unit 20 produces the main real address as the output real address.

More specifically, the main address translation unit 20 comprises an address translation buffer 21 and a virtual address comparator 22. The address translation buffer 21 is referred to a Translation Lookaside Buffer (TLB). The address translation buffer 21 is connected to the virtual address register 10. The address translation buffer 21 has a buffer capacity and has a buffer access time as the main access time. The address translation buffer 21 stores buffer fields of virtual addresses and buffer real addresses corresponding to the respective virtual addresses. Each of the buffer fields of the virtual addresses corresponds to the first field A of the held virtual address. The address translation buffer 21 is accessed by the second field B of the held virtual address as a buffer access address to produce, as an output buffer field of the virtual address and an output buffer real address, one of the buffer fields of the virtual addresses and one of the buffer real addresses, respectively, that are stored in the buffer access address. The address translation buffer 21 produces the output buffer real address as the output real address.

The virtual address comparator 22 is connected to the virtual address register 10 and the address translation buffer 21. The virtual address comparator 22 compares the first field A of the held virtual address with the output buffer field of the virtual address. The virtual address comparator 22 produces a virtual address coincidence signal when the first field A of the held virtual address coincides with the output buffer field of the virtual address.

The output real address and the virtual address coincidence signal are supplied to a buffer storage (not shown) which may be called a cache storage. As well known in the art, the buffer storage comprises a data array unit and an address array unit. The address array unit may be referred to a directory unit. The data array unit comprises a data array for storing data and instructions which are used in an execution processing unit (EPU, not shown) of a central processing unit. The address array unit comprises an address array for storing information indicative of which blocks in a main storage are fetched in the buffer storage. At any rate, in the address array unit, the output real address is compared with the information stored in the address array in order to detect whether or not requested data is stored in the data array.

The address translation buffer 21 has the buffer capacity which is relatively large and the buffer access time which is relatively longer. As a result, the conventional address translation device is disadvantageous in that address translation of the input address into the output address wastes a translation time longer than the buffer access time, as mentioned in the preamble of the instant specification.

Figure 2:
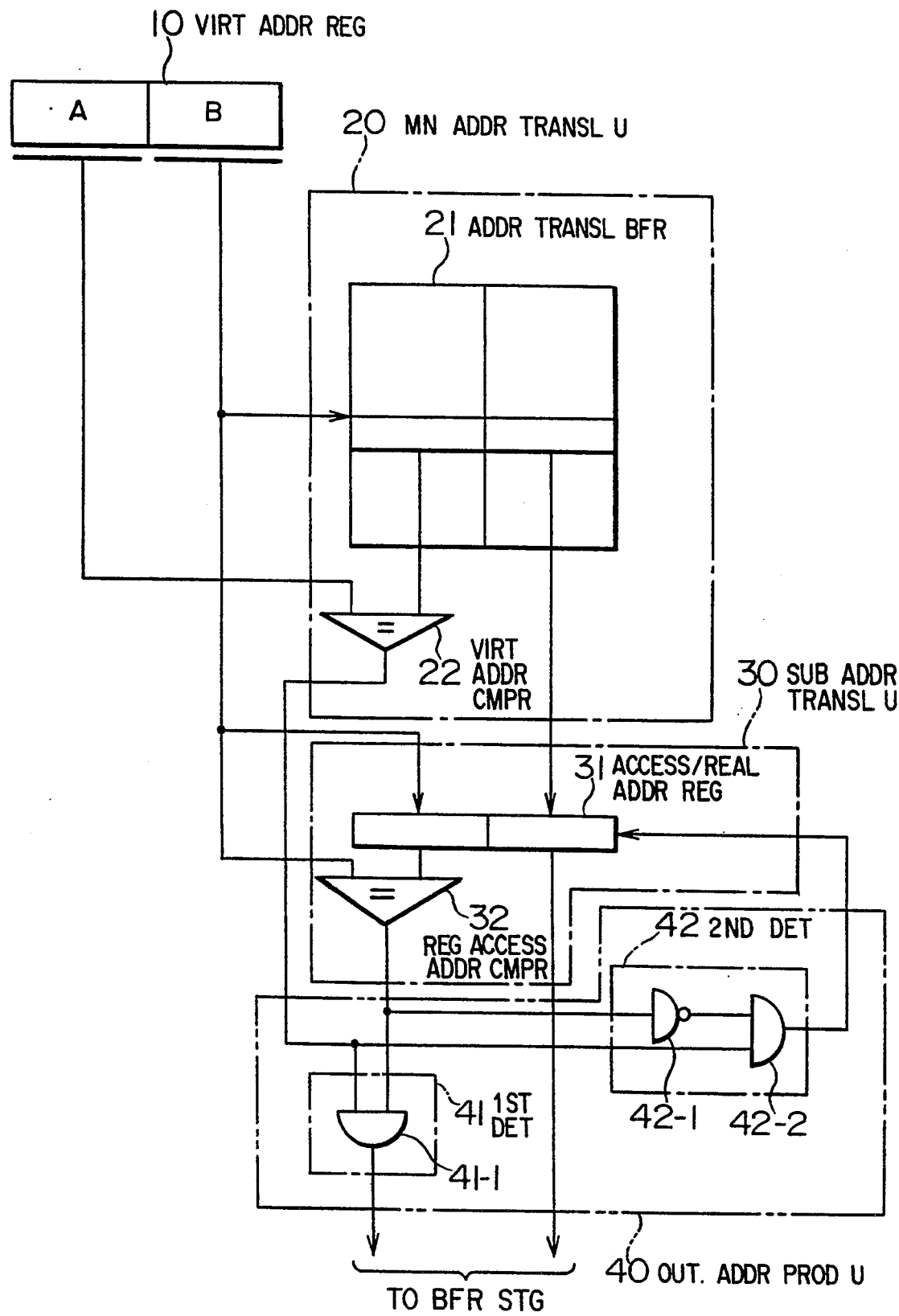
FIG. 2 is a block diagram of an address translation device according to a first embodiment of this invention.

Referring to FIG. 2, an address translation device according to a first embodiment of this invention is similar in structure to that illustrated in FIG. 1 except that the address translation device comprises a subsidiary address translation unit 30 and an output address production unit 40.

The subsidiary address translation unit 30 is connected to the main address translation unit 30 and is supplied with the held virtual address. The subsidiary address translation unit 30 has a subsidiary access time shorter than the main access time. The subsidiary address translation unit 30 translates the held virtual address into a subsidiary real address.

More particularly, the subsidiary address translation unit 30 comprises an access/real address register 31 and a register access address comparator 32. The access/real address register 31 is connected to the virtual address register 10 and the address translation buffer 21. The access/real address register 31 has a register capacity smaller than the buffer capacity and a register access time shorter than the buffer access time. The register access time corresponds to the subsidiary access time. The access/real address register 31 is supplied with a buffer presence/register absence signal from the output address production unit 40 in the manner which will later become clear. Responsive to the buffer presence/register absence signal, the access/real address register 31 holds the buffer access address and the output buffer real address as a held access address and a held real address, respectively. The access/real address register 31 produces the held access address and the held real address as an output register access address and the output real address, respectively.

The register access address comparator 32 is connected to the virtual address register 10 and the access/real address register 31. The register access address comparator 32 compares the buffer access address with the output register access address. The register access address comparator 32 produces a register access address coincidence signal when the buffer access address coincides with the output register access address.

The output address production unit 40 is connected to the main address translation unit 20 and the subsidiary address translation unit 30. The output address production unit 40 selectively produces one of the main real address and the subsidiary real address as the output real address.

More specifically, the output address production unit 40 comprises first and second detectors 41 and 42. The first detector 41 is connected to the virtual address comparator 22 and the register access address comparator 32. Responsive to the virtual address coincidence signal and the register access address coincidence signal, the first detector 41 detects whether the held real address corresponding to the input virtual address is present or absent in the access/real address register 31. The first detector 41 produces a register presence signal indicative of presence in the access/real address register 31 when both of the virtual address coincidence signal and the register access address coincidence signal are supplied thereto.

In the example being illustrated, the first detector 41 comprises a first AND gate 41-1 connected to the virtual address comparator 22 and the register access address comparator 32. The first AND gate 41-1 carries out an AND operation on the virtual address coincidence signal and the register access address coincidence signal to produce a first AND'ed output signal as the register presence signal.

The second detector 42 is connected to the virtual address comparator 22, the register access address comparator 32, and the access/real address register 31. Responsive to the virtual address coincidence signal and the register access address coincidence signal, the second detector 42 detects that the buffer real address corresponding to the input virtual address is present in the address translation buffer 21 and that the held real address corresponding to the input virtual address is absent in the access/real address register 31. The second detector 42 produces the buffer presence/register absence signal indicative of presence in the address translation buffer 21 and of absence in the access/real address register 31 when the virtual address coincidence signal is supplied thereto and when the register access address coincidence signal is not supplied thereto. The second detector 42 thereby makes the access/real address register 31 hold the buffer access address and the output buffer real address in response to the buffer presence/register absence signal.

In the example being illustrated, the second detector 42 comprises an inverter 42-1 and a second AND gate 42-2. The inverter 42-1 is connected to the register access address comparator 32. The inverter 42-1 carries out an inverting operation on the register access address coincidence signal to produce an inverted output signal. The second AND gate 42-2 is connected to the virtual address comparator 22 and the inverter 42. The second AND gate 42-2 carries out another AND operation on the virtual address coincidence signal and the inverted output signal to produce a second AND'ed output signal as the buffer presence/register absence signal.

As well known in the art, when the virtual address comparator 22 and the register access address comparator 32 produce no virtual address coincidence signal and no register access address coincidence signal, address translation is carried out by using a page table (not shown) in the main storage and then a result of the address translation is stored in the address translation buffer 21. In this event, the access/real address register 31 does not hold the buffer access address and the output buffer real address. This is because the second detector 42 produces no buffer presence/register absence signal.

With this structure, it is possible to rapidly carry out the address translation if the required real address is held in the access/real address register 31. In addition, the address translation device comprises the conventional address translation device illustrated in FIG. 1 with addition of little hardware. This is because the access/real address register 31 does not hold the first field A of the held virtual address which is held in the virtual address register 10.

Figure 3:
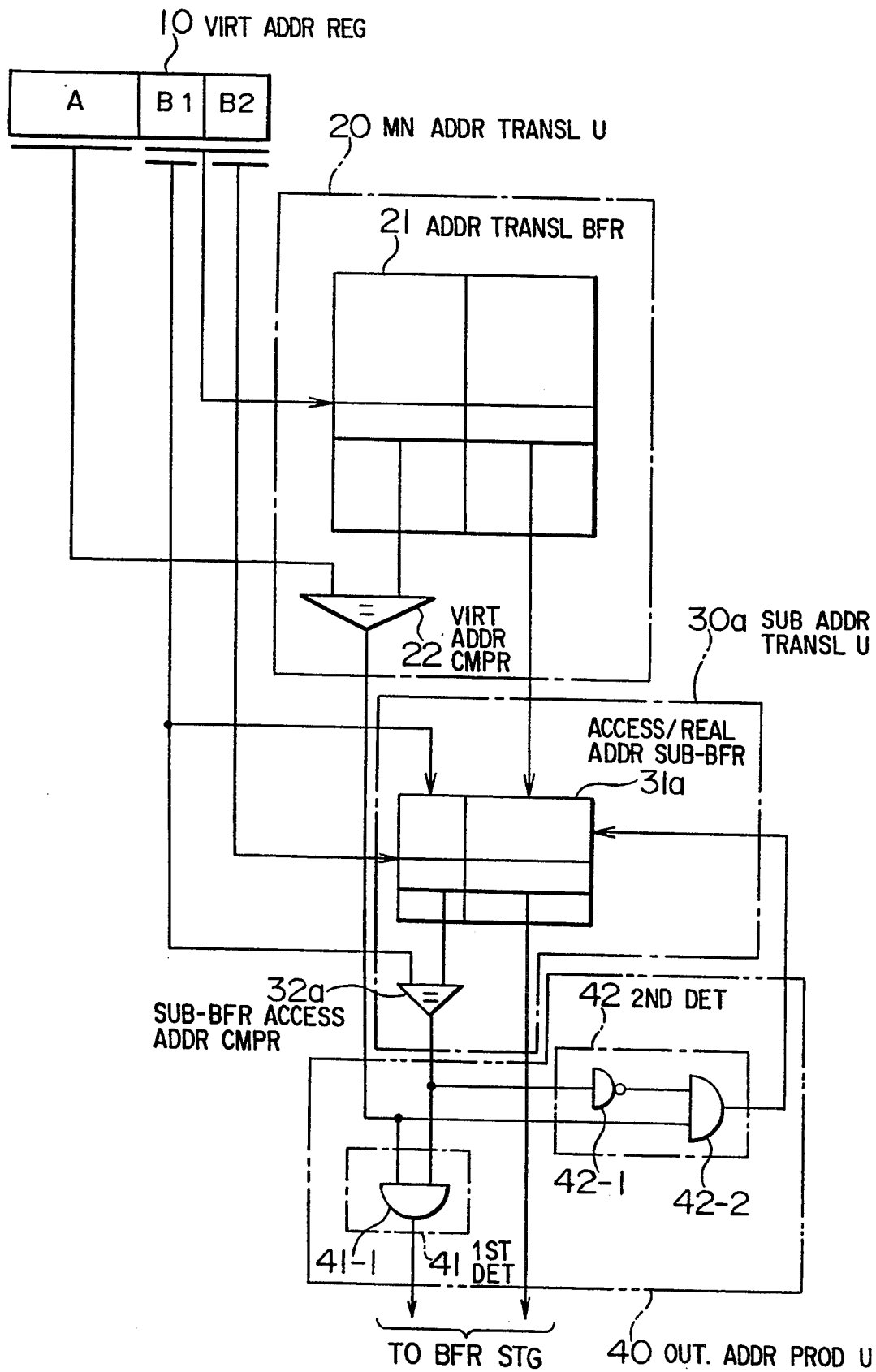
FIG. 3 is a block diagram of an address translation device according to a second embodiment of this invention.

Referring to FIG. 3, an address translation device according to a second embodiment of this invention is similar in structure to that illustrated in FIG. 2 except that the subsidiary address translation unit is modified to be different from that described in conjunction with FIG. 1 as will later become clear. The subsidiary address translation unit is therefore depicted at 20a. The second field B of the held virtual address is divided into first and second sub-fields B1 and B2.

The subsidiary address translation unit 30a comprises an access/real address sub-buffer 31a and a sub-buffer access address comparator 32a. The access/real address sub-buffer 31a is connected to the virtual address register 10 and the address translation buffer 21. The access/real address sub-buffer 31a has a sub-buffer capacity smaller than the buffer capacity and a sub-buffer access time shorter than the buffer access time. Responsive to the buffer presence/sub-buffer absence signal, the access/real address sub-buffer 31a stores the first sub-field B1 of the held virtual address and the output buffer real address in the second sub-field of the held virtual address as a stored access sub-address and a stored sub-buffer real address, respectively. The access/real address sub-buffer 31a is accessed by the second sub-field B2 of the held virtual address as a sub-buffer access address to produce, as an output sub-buffer access address and the output real address, the stored access sub-address and the stored sub-buffer real address, respectively, which are stored in the sub-buffer access address.

The sub-buffer access address comparator 32a is connected to the virtual address register 10 and the access/-real address sub-buffer 31a. The sub-buffer access address comparator 32a compares the first sub-field B1 of the held virtual address with the output sub-buffer access address. The sub-buffer access address comparator 32a produces a sub-buffer access address coincidence signal when the first sub-field B1 of the held virtual address coincides with the output sub-buffer access address. The sub-buffer access address coincidence signal is delivered to the output address production unit 40.

With this structure, it is possible to rapidly carry out the address translation if the required real address is stored in the access/real address register 31a. In addition, the address translation device comprises the conventional address translation device illustrated in FIG. 1 with addition of little hardware. This is because the access/real address register 31a does not store the first field A of the held virtual address which is held in the virtual address register 10. Furthermore, it is possible for the address translation device illustrated in FIG. 3 to carry out the address translation at a wider range than that of the address translation device illustrated in FIG. 2.

Figure 4:
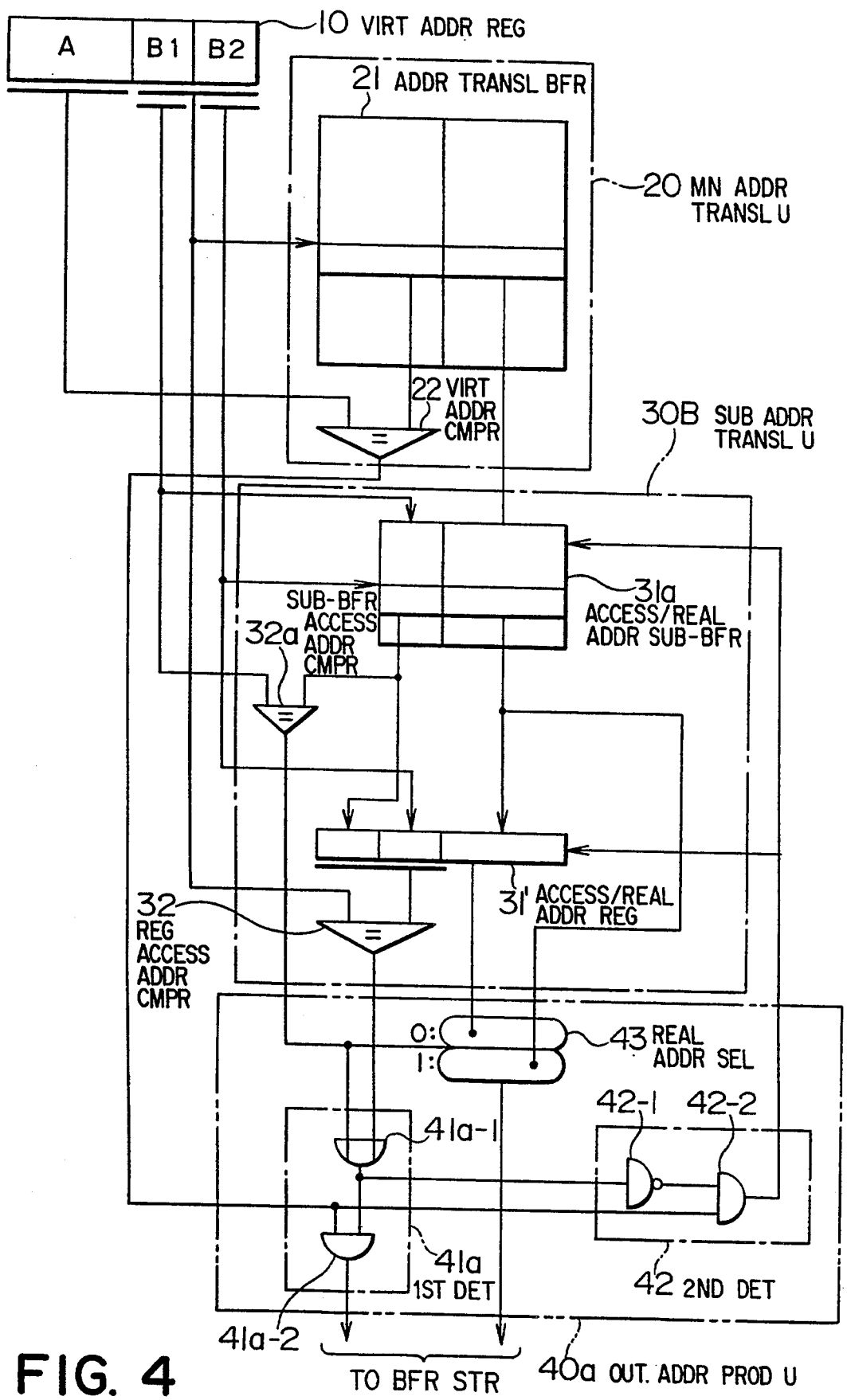
FIG. 4 is a block diagram of an address translation device according to a third embodiment of this invention.

Referring to FIG. 4, an address translation device according to a third embodiment of this invention is similar in structure to that illustrated in FIG. 3 except that the subsidiary address translation unit and the output address production unit are modified to be different from these described in conjunction with FIG. 3 as will later become clear. The subsidiary address are therefore depicted at 30b and 40a.

The subsidiary address translation unit 30b comprises not only the access/real address sub-buffer 31a and the sub-buffer access address comparator 32a but also an access/real address register 31' and the register access address comparator 32.

The access/real address register 31' is connected to the virtual address register 10 and the access/real address sub-buffer 31a. The access/real address register 31' is supplied with a buffer presence/sub-buffer absence/register absence signal from the output address production unit 40a in the manner which will later become clear. Responsive to the buffer presence/sub-buffer absence/register absence signal, the access/real address register 31' holds a combination of the output sub-buffer access address and the sub-buffer access address and the output sub-buffer real address as the held access address and the held real address, respectively. The access/real address register 31' produces the held access address and the held real address as the output register access address and the output register real address, respectively.

The output address production unit 40a comprises a first detector 41a, the second detector 42, and a real address selector 43.

The real address selector 43 is connected to the access/real address sub-buffer 31a, the access/real address register 31', and the sub-buffer access address register 31', and the sub-buffer access address comparator 32a. Responsive to the sub-buffer access address coincidence signal, the real address selector 43 selects one of the output sub-buffer real address and the output register real address as the output real address. More specifically, the real address selector 43 selects the output sub-buffer real address as the output real address when the sub-buffer access address coincidence signal is supplied thereto. The real address selector 43 selects the output register real address as the output real address when the sub-buffer access address coincidence signal is not supplied thereto.

Instead of the real address selector 43, the output address production unit 40a may comprise another real address selector which is connected to the access/real address sub-buffer 31a, the access/real address register 31', and the register access address comparator 32. Such a real address selector will later be described in conjunction with FIG. 6.

The first detector 41a is connected to the virtual address comparator 22, the register access address comparator 32, and the sub-buffer access address comparator 32a. Responsive to the virtual address coincidence signal, the register access address coincidence signal, and the sub-buffer access address coincidence signal, the first detector 41a detects that either the stored sub-buffer real address corresponding to the input virtual address is present in the access/real address sub-buffer 31a or the held real address corresponding to the input virtual address is present in the access/real address register 31'. The first detector 41a produces a sub-buffer presence/register presence signal indicative of either presence in the access/real address sub-buffer 31a or presence in the access/real address register 31' when the virtual access address coincidence signals is supplied thereto and when selected at least one of the register access address coincidence signal and the sub-buffer access address coincidence signal are supplied thereto.

More specifically, the first detector 41a comprises an OR gate 41a-1 and a first AND gate 41a-2. The OR gate 41a-1 is connected to the register access address comparator 32 and the sub-buffer access address comparator 32a. The OR gate 41a-1 carries out an OR operation on the register access address coincidence signal and the sub-buffer access address coincidence signal to produce an OR'ed output signal. The first AND gate 41a-2 is connected to the virtual address comparator 22 and the OR gate 41a-1. The first AND gate 41a-2 carries out an AND operation on the virtual address coincidence signal and the OR'ed output signal to produce a first AND'ed output signal as the sub-buffer presence/register presence signal.

The second detector 42 is connected to the virtual address comparator 22, the register access address comparator 32, and the sub-buffer access address comparator 32a. Responsive to the virtual address coincidence signal, the register access address coincidence signal, and the sub-buffer access address coincidence signal, the second detector 42 detects that the buffer real address corresponding to the input virtual address is present in the address translation buffer 21 and that both of the stored sub-buffer real address and the held real address corresponding to the input virtual address are absent in both of the access/real address sub-buffer 31a and the access/real address register 31'. The second detector 42 produces the buffer presence/sub-buffer absence/register absence signal indicative of presence in the address translation buffer 21 and of absence in both the access/real address sub-buffer 31a and the access/real address register 31' when the virtual address coincidence signal is supplied thereto and when both of the register access address coincidence signal and the sub-buffer access address coincidence signal are not supplied thereto. The second detector 42 thereby makes the access/real address sub-buffer 31a store the first sub-field B1 of the held virtual address and the output buffer real address in response to the buffer presence/sub-buffer absence/register absence signal and makes the access/real address register 31' hold the output sub-buffer access address, the sub-buffer access address, and the output sub-buffer real address in response to the buffer presence/sub-buffer absence/register absence signal. 42-1 and the second AND gate 42-2. The inverter 42-1 is connected to the OR gate 41a-1. The inverter 42-1 carries out an inverting operation on the OR'ed output signal to produce an inverted output signal. The second AND gate 42-2 is connected to the virtual address comparator 22 and the inverter 41-1. The second AND gate 42-2 carries out an AND operation on the virtual address coincidence signal and the inverted output signal to produce a second AND'ed output signal as the buffer presence/sub-buffer absence/register absence signal.

With this structure, it is possible to rapidly carry out the address translation if the required real address is either stored in the access/real address sub-buffer 31a or held in the access/real address register 31'. In addition, the address translation device comprises the conventional address translation device illustrated in FIG. 1 with addition of little hardware. This is because the access/real address register 31' does not store the first field A of the held virtual address which is held in the virtual address register 10. Furthermore, it is possible for the address translation device illustrated in FIG. 4 to store two real addresses both of which correspond to the same second sub-field B2 in the held virtual address while it is possible to the address translation device illustrated in FIG. 3 to store only one real address which corresponds to the same second sub-field B2 in the held virtual address.

Figure 5:
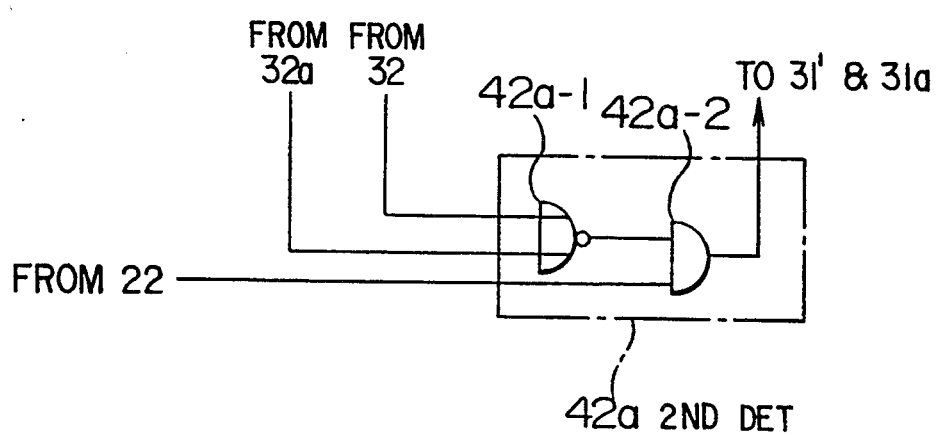
FIG. 5 is a block diagram of a modified second detector for use in the address translation device illustrated in FIG. 4.

Turning to FIG. 5, the output address production unit 40a may comprise a modified second detector 42a instead of the second detector 42. The modified second detector 42a comprises a NOR gate 42a-1 and a second AND gate 42a-2. The NOR gate 42a-1 is connected to the register access address comparator 32 and the sub-buffer access address comparator 32a. The NOR gate 42a-1 carries out a NOR operation on the register access address coincidence signal and the sub-buffer access address coincidence signal to produce a NOR'ed output signal. The second AND gate 42a-2 is connected to the virtual address comparator 22 and the NOR gate 42a-1. The second AND gate 42a-2 carries out an AND operation on the virtual address coincidence signal and the NOR'ed output signal to produce an AND'ed output signal as the buffer presence/sub-buffer absence/register absence signal.

Figure 6:
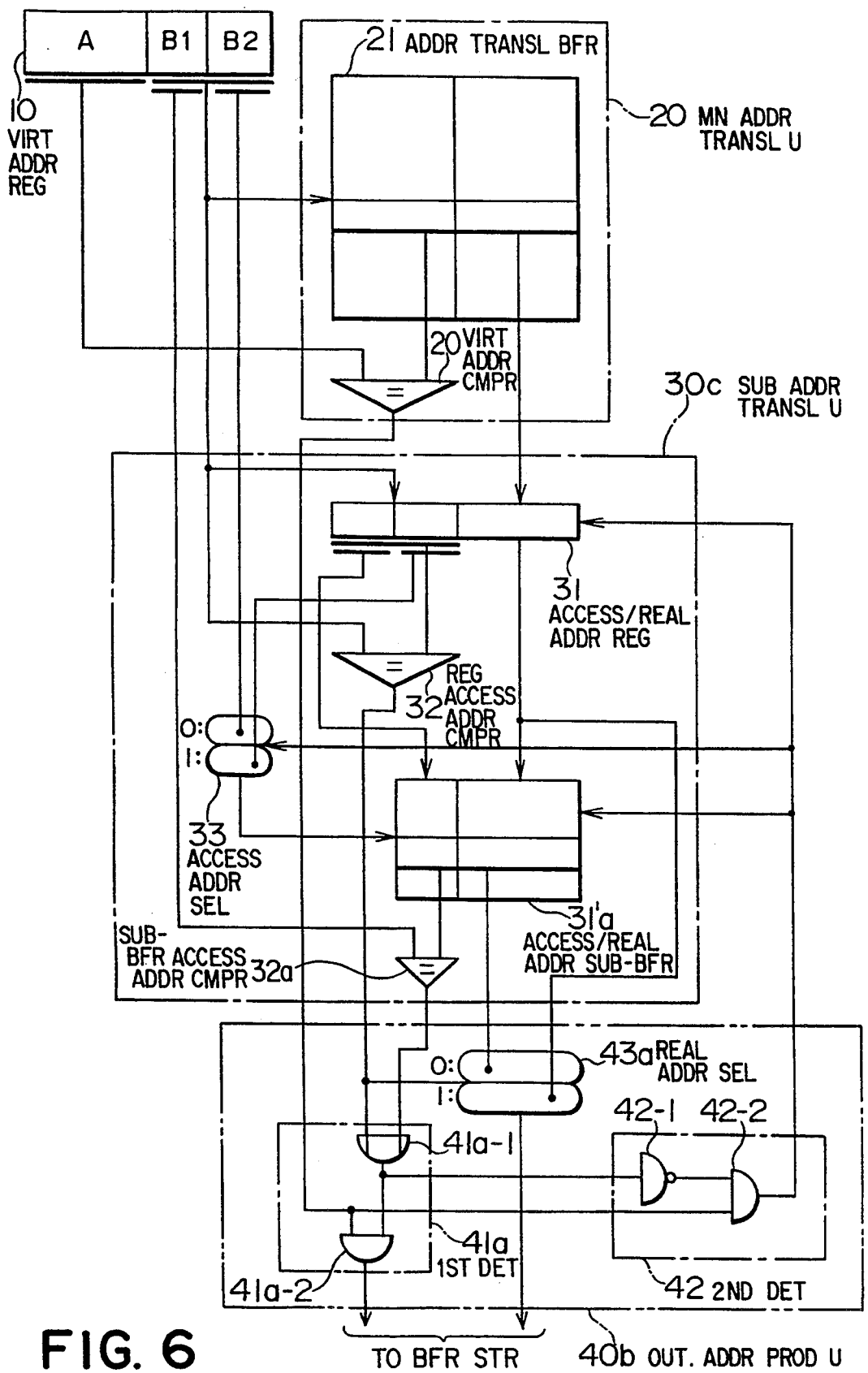
FIG. 6 is a block diagram of an address translation device according to a fourth embodiment of this invention.

Referring to FIG. 6, an address translation device according to a fourth embodiment of this invention is similar in structure to that illustrated in FIG. 4 except that the subsidiary address translation unit and the output address production unit are modified to be different from those described in conjunction with FIG. 4 as will later become clear. The subsidiary address translation unit and the output address production unit are therefore depicted at 30c and 40b.

The subsidiary address translation unit 30c comprises the access/real address register 31, the register access address comparator 32, an access/real address sub-buffer 31'a, the sub-buffer access address comparator 32a, and an access address selector 33.

In the access/real address register 31, the held access address is divided into first and second held access sub-addresses. The access/real address register 31 produces the first and the second held access sub-addresses as first and second register access sub-addresses, respectively.

The access address selector 33 is connected to the virtual address register 10 and the access/real address register 31. Responsive to the buffer presence/sub-buffer absence/register absence signal, the access address selector 33 selects one of the second sub-field B2 of the held virtual address and the second output register access sub-address as a sub-buffer access address. More particularly, the access address selector 33 selects the second sub-field B2 of the held virtual address as the sub-buffer access address when the buffer presence/sub-buffer absence/register absence signal is not supplied thereto. The access address selector selects the second output register access sub-address as the sub-buffer access address when the buffer presence/sub-buffer absence/register absence signal is supplied thereto. The sub-buffer access address is supplied to the access/real address sub-buffer 31'a to access the access/real address sub-buffer 31'a.

The access/real address sub-buffer 31'a is connected to the virtual address register 10, the access/real address register 31, and the access address selector 33. Responsive to the buffer presence/sub-buffer absence/register absence signal, the access/real address sub-buffer 31'a stores the first output register access sub-address and the output register real address in the sub-buffer access address as a stored access sub-address and a stored sub-buffer real address, respectively. Accessed by the sub-buffer access address, the access/real address sub-buffer 31'a produces as an output sub-buffer access address and an output sub-buffer real address, the stored access sub-address and the stored sub-buffer real address, respectively, which are stored in the sub-buffer access address.

The output address production unit 40b comprises the first and the second detectors 41a and 42, and another real address selector 43a.

The real address selector 43a is connected to the access/real address sub-buffer 31'a, the access/real address register 31, and the register access address comparator 32. Responsive to the register access address coincidence signal, the real address selector 43a selects one of the output sub-buffer real address and the output register real address as the output real address. More specifically, the real address selector 43a selects the output sub-buffer real address as the output real address when the register access address coincidence signal is not supplied thereto. The real address selector 43a selects the output register real address as the output real address when the register access address coincidence signal is supplied thereto.

Instead of the real address selector 43a, the output address production unit 40b may comprise the real address selector 43 which is illustrated in FIG. 4.

Although the output address production unit 40b comprises the second detector 42 which comprises the inverter 42-1 and the AND gate 42-2, the output address production unit 40b may comprise the modified second detector 42a as illustrated in FIG. 5, in place of the second detector 42.

With this structure, it is possible to rapidly carry out the address translation if the required real address is either held in the access/real address register 31 or stored in the access/real address sub-buffer 31'a. This is because the access/real address register 31 and the access/real address sub-buffer 31'a have the register and the sub-buffer access times both of which are shorter than the buffer access time of the address translation buffer 21. In addition, the address translation device comprises the conventional address translation device illustrated in FIG. 1 with addition of little hardware. This is because each of the access/real address register 31 and the access/real address sub-buffer 31'a does not hold or store the first field A of the held virtual address which is held in the virtual address register 10. Furthermore, it is possible for the address translation device illustrated in FIG. 6 to store two real addresses both of which correspond to the same second sub-field B2 in the held virtual address while it is possible to the address translation device illustrated in FIG. 3 to store only one real address which corresponds to the same second sub-field B2 in the held virtual address. It is possible to make the address translation device illustrated in FIG. 6 carry out the address translation at a higher speed as compared with the address translation device illustrated in FIG. 4. This is because the address translation device illustrated in FIG. 4 has a longest signaling delay time defined by a path from the virtual address register 10 to the real address selector 43 via the access/real address sub-buffer 31a and the sub-buffer access address comparator 32a while the address translation device illustrated in FIG. 6 has a different longest signaling delay time, shorter than the largest signaling delay time, that is defined by another path from the virtual address register 10 to the real address selector 43a via the access/real address register 31 and the register access address comparator 32.

What is claimed is:

1. An address translation device for translating an input virtual address into an output real address, said device comprising:

a virtual address register for holding said input virtual address as a held virtual address which is divided into first and second fields;

an address translation buffer having a buffer capacity and a buffer access time and is connected to said virtual address register for storing buffer fields of virtual addresses and buffer real addresses corresponding to the respective virtual addresses, each of said buffer fields of the virtual addresses corresponding to said first field of said held virtual address, said address translation buffer being accessed by said second field of said held virtual address as a buffer access address to produce, as an output buffer field of the virtual address and an output buffer real address, one of said buffer fields of the virtual addresses and one of said buffer real addresses, respectively;

a virtual address comparator connected to said virtual address register and said address translation buffer for comparing said first field of the held virtual address with said output buffer field of the virtual address, said virtual address comparator producing a virtual address coincidence signal when said first field of the held virtual address coincides with said output buffer field of the virtual address;

an access/real address register having a register capacity smaller than said buffer capacity and a register access time shorter than said buffer access time, and connected to said virtual address register and said address translation buffer for holding, in response to a buffer presence/register absence signal, said buffer access address and said output buffer real address as a held access address and a held real address, respectively, said access/real address register producing said held access address and said held real address as an output register access address and said output real address, respectively;

a register access address comparator connected to said virtual address register and said access/real address register for comparing said buffer access address with said output register access address, said register access address comparator producing a register access address coincidence signal when said buffer access address coincides with said output register access address;

first detection means connected to said virtual address comparator and said register access address comparator for detecting, in response to said virtual address coincidence signal and said register access address coincidence signal, whether the held real address corresponding to said input virtual address is present or absent in said access/real address register, said first detection means producing a register presence signal indicative of presence in said access/real address register when both of said virtual address coincidence signal and said register access address coincidence signal are supplied thereto; and second detection means connected to said virtual address comparator, said register access address comparator, and said access/real address register for detecting, in response to said virtual address coincidence signal and said register access address coincidence signal, that the buffer real address corresponding to said input virtual address is present in said address translation buffer and that the held real address corresponding to said input virtual address is absent in said access/real address register, said second detection means producing said buffer presence/register absence signal indicative of presence in said address translation buffer and of absence in said access/real address register when said virtual address coincidence signal is supplied thereto and when said register access address coincidence signal is not supplied thereto, thereby making said access/real address register hold said buffer access address and said output buffer real address in response to said buffer presence/register absence signal.

2. An address translation device as claimed in claim 1, wherein said first detection means comprises an AND gate connected to said virtual address comparator and said register access address comparator for carrying out an AND operation on said virtual address coincidence signal and said register access address coincidence signal to produce and AND'ed output signal as said register presence signal.

3. An address translation device as claimed in claim 1, wherein said second detection means comprises an inverter connected to said register access address comparator for carrying out an inverting operation on said register access address coincidence signal to produce an inverted output signal and an AND gate connected to said virtual address comparator and said inverter for carrying out an AND operation on said virtual address coincidence signal and said inverted output signal to produce an AND'ed output signal as said buffer presence/register absence signal.

4. An address translation device for translating an input virtual address into an output real address, said device comprising:

a virtual address register for holding said input virtual address as a held virtual address which is divided into first and second fields, said second field being divided into first and second sub-fields;

an address translation buffer having a buffer capacity and a buffer access time and connected to said virtual address register for storing buffer fields of virtual addresses and buffer real addresses corresponding to the respective virtual addresses, each of said buffer fields of the virtual addresses corresponding to said first field of said held virtual address, said address translation buffer being accessed by said second field of said held virtual address as a buffer access address to produce, as an output buffer field of the virtual address and an output buffer real address, one of said buffer fields of said virtual addresses and one of said buffer real addresses, respectively;

a virtual address comparator connected to said virtual address register and said address translation buffer for comparing said first field of the held virtual address with said output buffer field of the virtual address, said virtual address comparator producing a virtual address coincidence signal when said first field of the held virtual address coincides with said output buffer field of the virtual address;

an access/real address sub-buffer having a sub-buffer capacity smaller than said buffer capacity and a sub-buffer access time shorter than said buffer access time, and connected to said virtual address register and said address translation buffer for storing, in response to a buffer presence/sub-buffer absence signal, said first sub-field of the held virtual address and said output buffer real address in said second sub-field of the held virtual address as a stored access sub-address and a stored sub-buffer real address, respectively, said access/real address sub-buffer being accessed by said second sub-field of the held virtual address as a sub-buffer access address to produce, as an output sub-buffer access address and said output real address, the stored access sub-address and the stored sub-buffer real address, respectively;

a sub-buffer access address comparator connected to said virtual address register and said access/real address sub-buffer for comparing said first sub-field of the held virtual address with said output sub-buffer access address, said sub-buffer access address comparator producing a sub-buffer access address coincidence signal when said first sub-field of the held virtual address coincides with said output sub-buffer access address;

first detection means connected to said virtual address comparator and said sub-buffer access address comparator for detecting, in response to said virtual address coincidence signal and said sub-buffer access address coincidence signal, whether the stored sub-buffer real address corresponding to said input virtual address is present or absent in said access/real address sub-buffer, said first detection means produces a sub-buffer presence signal indicative of presence in said access/real address sub-buffer when both of said virtual address coincidence signal and said sub-buffer access address coincidence signal are supplied thereto; and second detection means connected to said virtual address comparator, said sub-buffer access address comparator, and said access/real address sub-buffer for detecting, in response to said virtual address coincidence signal and said sub-buffer access address coincidence signal, that the buffer real address corresponding to said input virtual address is present in said address translation buffer and that the stored sub-buffer real address corresponding to said input virtual address is absent in said access/real address sub-buffer, said second detection means producing said buffer presence/sub-buffer absence signal indicative of presence in said address translation buffer and of absence in said access/real address sub-buffer when said virtual address coincidence signal is supplied thereto and when said sub-buffer access address coincidence signal is not supplied thereto, thereby making said access/real address sub-buffer hold said first sub-field of the held virtual address and said output buffer real address in response to said buffer presence/absence signal.

5. An address translation device as claimed in claim 4, wherein said first detection means comprises an AND gate connected to said virtual address comparator and said sub-buffer access address comparator for carrying out an AND operation on said virtual address coincidence signal and said sub-buffer access address coincidence signal to produce an AND'ed output signal as said sub-buffer presence signal.

6. An address translation device as claimed in claim 4, wherein said second detection means comprises an inverter connected to said sub-buffer access address comparator for carrying out an inverting operation on said sub-buffer access address coincidence signal to produce an inverted output signal and an AND gate connected to said virtual address comparator and said inverter for carrying out an AND operation on said virtual address coincidence signal and said inverted output signal to produce an AND'ed output signal as said buffer presence/sub-buffer absence signal.

7. An address translation device for translating an input virtual address into an output real address, said device comprising:

a virtual address register for holding said input virtual address as a held virtual address which is divided into first and second fields, said second field being divided into first and second sub-fields;

an address translation buffer having a buffer capacity and a buffer access time and connected to said virtual address register for storing buffer fields of virtual addresses and buffer real addresses corresponding to the respective virtual addresses, each of said buffer fields of the virtual addresses corresponds to said first field of said held virtual address, said address translation buffer being accessed by said second field of said held virtual address as a buffer access address to produce, as an output buffer field of the virtual address and an output buffer real address, one of said buffer fields of said virtual addresses and one of said buffer real addresses, respectively;

a virtual address comparator connected to said virtual address register and said address translation buffer for comparing said first field of the held virtual address with said output buffer field of the virtual address, said virtual address comparator producing a virtual address coincidence signal when said first field of the held virtual address coincides with said output buffer field of the virtual address;

an access/real address sub-buffer having a sub-buffer capacity smaller than said buffer capacity and a sub-buffer access time shorter than said buffer access time, and connected to said virtual address register and said address translation buffer for storing, in response to a buffer presence/sub-buffer absence/register absence signal, said first sub-field of the held virtual address and said output buffer real address in said second sub-field of the held virtual address as a stored access sub-address and a stored sub-buffer real address, respectively, said access/real address sub-buffer being accessed by said second sub-field of the held virtual address as a sub-buffer access address to produce, as an output sub-buffer access address and an output sub-buffer real address, the stored access sub-address and the stored sub-buffer real address, respectively;

a sub-buffer access address comparator connected to said virtual address register and said access/real address sub-buffer for comparing said first sub-field of the held virtual address with said output sub-buffer access address, said sub-buffer access address comparator producing a sub-buffer access address coincidence signal when said first sub-field of the held virtual address coincides with said output sub-buffer access address;

an access/real address register having a register capacity smaller than said buffer capacity and a register access time shorter than said buffer access time, and connected to said virtual address register and said access/real address sub-buffer for holding, in response to said buffer presence/sub-buffer absence/register absence signal, a combination of said output sub-buffer access address and said sub-buffer access address and said output sub-buffer real address as a held access address and a held real address, respectively, said access/real address register producing said held access address and said held real address as an output register access address and an output register real address, respectively;

a register access address comparator connected to said virtual address register and said access/real address register for comparing said buffer access address with said output register access address, said register access address comparator producing a register access address coincidence signal when said buffer access address coincides with said output register access address;

a real address selector connected to said access/real address sub-buffer, said access/real address register, and said sub-buffer access address comparator for selecting, in response to said sub-buffer access address coincidence signal, one of said output sub-buffer real address and said output register real address as said output real address;

first detection means connected to said virtual address comparator and said sub-buffer and said register access address comparators for detecting, in response to said virtual address coincidence signal and said sub-buffer and said register access address coincidence signals, that either the stored sub-buffer real address corresponding to said input virtual address is present in said access/real address sub-buffer or the held real address corresponding to said input virtual address is present in said access/real address register, said first detection means producing a sub-buffer presence/register presence signal indicative of either presence in said access/real address sub-buffer or presence in said access/real address register when said virtual access address coincidence signal is supplied thereto and when at least one of said sub-buffer and said register access address coincidence signals is supplied thereto; and second detection means connected to said virtual address comparator, said sub-buffer and said register access address comparators, said access/real address sub-buffer, and said access/real address register for detecting, in response to said virtual address coincidence signal and said sub-buffer and said register access address coincidence signals, that the buffer real address corresponding to said input virtual address is present in said address translation buffer and that both of the stored sub-buffer real address and said held real address corresponding to said input virtual address are absent in both of said access/real address sub-buffer and said access/real address register, said second detection means producing said buffer presence/sub-buffer absence/register absence signal indicative of presence in said address translation buffer and of absence in both of said access real address sub-buffer and said access/real address register when said virtual address coincidence signal is supplied thereto and when both of said sub-buffer and said register access address coincidence signals are not supplied thereto, thereby making said access/real address sub-buffer store said first sub-field of the held virtual address and said output buffer real address in response to said buffer presence/sub-buffer absence/register absence signal and making said access/real address register hold said output sub-buffer access address, said sub-buffer access address, and said output sub-buffer real address in response to said buffer presence/sub-buffer absence/register absence signal.

8. An address translation device as claimed in claim 7, wherein said real address selector selects said output sub-buffer real address as said output real address when said sub-buffer access address coincidence signal is supplied thereto, said real address selector selecting said output register real address as said output real address when said sub-buffer access address coincidence signal is not supplied thereto.

9. An address translation device as claimed in claim 7, wherein said first detection means comprises an OR gate connected to said sub-buffer and said register access address comparators for carrying out an OR operation on said sub-buffer and said register access address coincidence signals to produce an OR'ed output signal and an AND gate connected to said virtual address comparator and said OR gate for carrying out an AND operation on said virtual address coincidence signal and said OR'ed output signal to produce an AND'ed output signal as said sub-buffer presence/register presence signal.

10. An address translation device as claimed in claim 7, wherein said second detection means comprises a NOR gate connected to said sub-buffer and said register access address comparators for carrying out a NOR operation on said sub-buffer and said register access address coincidence signals to produce a NOR'ed output signal and an AND gate connected to said virtual address comparator and said NOR gate for carrying out an AND operation on said virtual address coincidence signal and said NOR'ed output signal to produce an AND'ed output signal as said buffer presence/sub-buffer absence signal.

11. An address translation device as claimed in claim 7, wherein said first detection means comprises:
   an OR gate connected to said sub-buffer and said register access address comparators for carrying out an OR operation on said sub-buffer and said register access address coincidence signals to produce an OR'ed output signal; and
   a first AND gate connected to said virtual address comparator and said OR gate for carrying out an AND operation on said virtual address coincidence signal and said OR'ed output signal to produce a first AND'ed output signal as said sub-buffer presence/register presence signal;
   said second detection means comprising:
   an inverter connected to said sub-buffer and said register access address comparators via said OR gate for carrying out an inverting operation on said OR'ed output signal to produce an inverted output signal; and
   a second AND gate connected to said virtual address comparator and said inverter for carrying out an AND operation on said virtual address coincidence signal and said inverted output signal to produce a second AND'ed output signal as said buffer presence/sub-buffer absence/register absence signal.

12. An address translation device for translating an input virtual address into an output real address, said device comprising:
   a virtual address register for holding said input virtual address as a held virtual address which is divided into first and second fields, said second field being divided into first and second sub-fields;
   an address translation buffer having a buffer capacity and a buffer access time and connected to said virtual address register for storing buffer fields of virtual addresses and buffer real addresses corresponding to the respective virtual addresses, each of said buffer fields of the virtual addresses corresponding to said first field of said held virtual address, said address translation buffer being accessed by said second field of said held virtual address as a buffer access address to produce, as an output buffer field of the virtual address and an output buffer real address, one of said buffer fields of said virtual addresses and one of said buffer real addresses, respectively;
   a virtual address comparator connected to said virtual address register and said address translation buffer for comparing said first field of the held virtual address with said output buffer field of the virtual address, said virtual address comparator producing a virtual address coincidence signal when said first field of the held virtual address coincides with said output buffer field of the virtual address;
   an access/real address sub-buffer having a sub-buffer capacity smaller than said buffer capacity and a sub-buffer access time shorter than said buffer access time, and connected to said virtual address register and said address translation buffer for storing, in response to a buffer presence/sub-buffer absence/register absence signal, said first sub-field of the held virtual address and said output buffer real address in said second sub-field of the held virtual address as a stored access sub-address and a stored sub-buffer real address, respectively, said access/real address sub-buffer being accessed by said second sub-field of the held virtual address as a sub-buffer access address to produce, as an output sub-buffer access address and an output sub-buffer real address, the stored access sub-address and the stored sub-buffer real address, respectively;
   a sub-buffer access address comparator connected to said virtual address register and said access/real address sub-buffer for comparing said first sub-field of the held virtual address with said output sub-buffer access address, said sub-buffer access address comparator producing a sub-buffer access address coincidence signal when said first sub-field of the held virtual address coincides with said output sub-buffer access address;
   an access/real address register having a register capacity smaller than said buffer capacity and a register access time shorter than said buffer access time, and connected to said virtual address register and said access/real address sub-buffer for holding, in response to said buffer presence/sub-buffer absence/register absence signal, a combination of said output sub-buffer access address and said sub-buffer access address and said output sub-buffer real address as a held access address and a held real address, respectively, said access/real address register producing said held access address and said held real address as an output register access address and an output register real address, respectively;
   a register access address comparator connected to said virtual address register and said access/real address register for comparing said buffer access address with said output register access address, said register access address comparator producing a register access address coincidence signal when said buffer access address coincides with said output register access address;
   a real address selector connected to said access/real address sub-buffer, said access/real address register, and said register access address comparator for selecting, in response to said register access address coincidence signal, one of said output sub-buffer real address and said output register real address as said output real address;
   first detection means connected to said virtual address comparator and said sub-buffer and said register access address comparators for detecting, in response to said virtual address coincidence signal and said sub-buffer and said register access address coincidence signals, that either the stored sub-buffer real address corresponding to said input virtual address is present in said access/real address sub-buffer or the held real address corresponding to said input virtual address is present in said access/real address register, said first detection means producing a sub-buffer presence/register presence signal indicative of either presence in said access/real address sub-buffer or presence in said access/real address register when said virtual access address coincidence signal is supplied thereto and when at least one of said sub-buffer and said register access address coincidence signals is supplied thereto; and second detection means connected to said virtual address comparator, said sub-buffer and said register access address comparators, said access/real address sub-buffer, and said access/real address register for detecting, in response to said virtual address coincidence signal and said sub-buffer and said register access address coincidence signals, that the buffer real address corresponding to said input virtual address is present in said address translation buffer and that both of the stored sub-buffer real address and said held real address corresponding to said input virtual address are absent in both of said access/real address sub-buffer and said access/real address register, said second detection means producing said buffer presence/sub-buffer absence/register absence signal indicative of presence in said address translation buffer and of absence in both of said access real address sub-buffer and said access/real address register when said virtual address coincidence signal is supplied thereto and when both of said sub-buffer and said register access address coincidence signals are not supplied thereto, thereby making said access/real address sub-buffer store said first sub-field of the held virtual address and said output buffer real address in response to said buffer presence/sub-buffer absence/register absence signal and making said access/real address register hold said output sub-buffer access address, said sub-buffer access address, and said output sub-buffer real address in response to said buffer presence/sub-buffer absence/register absence signal.

13. An address translation device as claimed in claim 12, wherein said real address selector selects said output sub-buffer real address as said output real address when said register access address coincidence signal is supplied thereto, said real address selector selecting said output register real address as said output real address when said register access address coincidence signal is supplied thereto.

14. An address translation device as claimed in claim 12, wherein said first detection means comprises an OR gate connected to said sub-buffer and said register access address comparators for carrying out an OR operation on said sub-buffer and said register access address coincidence signals to produce an OR'ed output signal and an AND gate connected to said virtual address comparator and said OR gate for carrying out an AND operation on said virtual address coincidence signal and said OR'ed output signal to produce an AND'ed output signal as said sub-buffer presence/register presence signal.

15. An address translation device as claimed in claim 12, wherein said second detection means comprises a NOR gate connected to said sub-buffer and said register access address comparators for carrying out a NOR operation on said sub-buffer and said register access address coincidence signals to produce a NOR'ed output signal and an AND gate connected to said virtual address comparator and said NOR gate for carrying out an AND operation on said virtual address coincidence signal and said NOR'ed output signal to produce an AND'ed output signal as said buffer presence/sub-buffer absence/register absence signal.

16. An address translation device as claimed in claim 12, wherein said first detection means comprises:

an OR gate connected to said sub-buffer and said register access address comparators for carrying out an OR operation on said sub-buffer and said register access address coincidence signals to produce an OR'ed output signal; and a first AND gate connected to said virtual address comparator and said OR gate for carrying out an AND operation on said virtual address coincidence signal and said OR'ed output signal to produce a first AND'ed output signal as said sub-buffer presence/register presence signal;

said second detection means comprising:

an inverter connected to said sub-buffer and said register access address comparators via said OR gate for carrying out an inverting operation on said OR'ed output signal to produce an inverted output signal; and a second AND gate connected to said virtual address comparator and said inverter for carrying out an AND operation on said virtual address coincidence signal and said inverted output signal to produce a second AND'ed output signal as said buffer presence/sub-buffer absence/register absence signal.

17. An address translation device for translating an input virtual address into an output real address, said device comprising:

a virtual address register for holding said input virtual address as a held virtual address which is divided into first and second fields, said second field being divided into first and second sub-fields;

an address translation buffer having a buffer capacity and a buffer access time and connected to said virtual address register for storing buffer fields of virtual addresses and buffer real addresses corresponding to the respective virtual addresses, each of said buffer fields of the virtual addresses corresponding to said first field of said held virtual address, said address translation buffer being accessed by said second field of said held virtual address as a buffer access address to produce, as an output buffer field of the virtual address and an output buffer real address, one of said buffer fields of said virtual addresses and one of said buffer real addresses, respectively;

a virtual address comparator connected to said virtual address register and said address translation buffer for comparing said first field of the held virtual address with said output buffer field of the virtual address, said virtual address comparator producing a virtual address coincidence signal when said first field of the held virtual address coincides with said output buffer field of the virtual address;

an access/real address register having a register capacity smaller than said buffer capacity and a register access time shorter than said buffer access time, and connected to said virtual address register and said address translation buffer for holding, in response to a buffer presence/sub-buffer absence/register absence signal, said buffer access address and said output buffer real address as a held access address and a held real address, respectively, said held access address being divided into first and second held access sub-addresses, said access/real address register producing said held access address and said held real address as an output register access address and an output register real address, respectively, said access/real address register producing said first and said second held access sub-addresses as first and second output register access sub-addresses, respectively;

a register access address comparator connected to said virtual address register and said access/real address register for comparing said buffer access address with said output register access address, said register access address comparator producing a register access address coincidence signal when said buffer access address coincides with said output register access address;

an access address selector connected to said virtual address register and said access/real address register for selecting, in response to said buffer presence/sub-buffer absence/register absence signal, one of said second sub-field of the held virtual address and said second output register access sub-address as a sub-buffer access address;

an access/real address sub-buffer having a sub-buffer capacity smaller than said buffer capacity and a sub-buffer access time shorter than said buffer access time, and connected to said virtual address register, said access/real address register, and said access address selector for storing, in response to said buffer presence/sub-buffer absence/register absence signal, said first output register access sub-address and said output register real address in said sub-buffer access address as a stored access sub-address and a stored sub-buffer real address, respectively, said access/real address sub-buffer being accessed by said sub-buffer access address to produce, as an output sub-buffer access address and an output sub-buffer real address, the stored access sub-address and the stored sub-buffer real address, respectively;

a sub-buffer access address comparator connected to said virtual address register and said access/real address sub-buffer for comparing said first sub-field of the held virtual address with said output sub-buffer access address, said sub-buffer access address comparator producing a sub-buffer access address coincidence signal when said first sub-field of the held virtual address coincides with said output sub-buffer access address;

a real address selector connected to said access/real address sub-buffer, said access/real address register, and said register access address comparator for selecting, in response to said register access address coincidence signal, one of said output sub-buffer real address and said output register real address as said output real address;

first detection means connected to said virtual address comparator and said register and said sub-buffer access address comparators for detecting, in response to said virtual address coincidence signal and said register and said sub-buffer access address coincidence signals, that either the stored sub-buffer real address corresponding to said input virtual address is present in said access/real address sub-buffer or the held real address corresponding to said input virtual address is present in said access/real address register, said first detection means producing a sub-buffer presence/register presence signal indicative of either presence in said access/real address sub-buffer or presence in said access/real address register when said virtual address coincidence signal is supplied thereto and when at least one of said register and said sub-buffer access address coincidence signals is supplied thereto; and second detection means connected to said virtual address comparator, said register and said sub-buffer access address comparators, said access/real address register, said access/real address sub-buffer, and said access address selector for detecting, in response to said virtual address coincidence signal and said register and said sub-buffer access address coincidence signals, that the buffer real address corresponding to said input virtual address is present in said address translation buffer and that both of the stored sub-buffer real address and said held real address corresponding to said input virtual address are absent in both of said access/real address register and said access/real address sub-buffer, said second detection means producing said buffer presence/sub-buffer absence/register absence signal indicative of presence in said address translation buffer and of absence in both of said access/real address sub-buffer and said access/real address register when said virtual address coincidence signal is supplied thereto and when both of said register and said sub-buffer access address coincidence signals are not supplied thereto, thereby making said access address selector select said second output register access sub-address as said sub-buffer access address in response to said buffer presence/sub-buffer absence/register absence signal, making said access/real address sub-buffer store said first output register access sub-address and said output register real address in said sub-buffer access address in response to said buffer presence/sub-buffer absence/register absence signal, and making said access/real address register hold said buffer access address and said output buffer real address in response to said buffer presence/sub-buffer absence/register absence signal.

18. An address translation device as claimed in claim 17, wherein said real address selector selects said output sub-buffer real address as said output real address when said register access address coincidence signal is not supplied thereto, said real address selector selecting said output register real address as said output real address when said register access address coincidence signal is supplied thereto.

19. An address translation device as claimed in claim 17, wherein said access address selector selects said second sub-field of the held virtual address as said sub-buffer access address when said buffer presence/sub-buffer absence/register absence signal is not supplied thereto, said access address selector selecting said second output register access sub-address as said sub-buffer access address when said buffer presence/sub-buffer absence/register absence signal is supplied thereto.

20. An address translation device as claimed in claim 17, wherein said first detection means comprises an OR gate connected to said register and said sub-buffer access address comparators for carrying out an OR operation on said register and said sub-buffer access address coincidence signals to produce an OR'ed output signal and an AND gate connected to said virtual address comparator and said OR gate for carrying out an AND operation on said virtual address coincidence signal and said OR'ed output signal to produce an AND'ed output signal as said sub-buffer presence signal.

21. An address translation device as claimed in claim 17, wherein said second detection means comprises a NOR gate connected to said register and said sub-buffer access address comparators for carrying out a NOR operation on said register and said sub-buffer access address coincidence signals to produce a NOR'ed output signal and an AND gate connected to said virtual address comparator and said NOR gate for carrying out an AND operation on said virtual address coincidence signal and said NOR'ed output signal to produce an AND'ed output signal as said buffer presence/sub-buffer absence/register absence signal.

22. An address translation device as claimed in claim 17, wherein said first detection means comprises:
an OR gate connected to said register and said sub-buffer access address comparators for carrying out an OR operation on said register and said sub-buffer access address coincidence signals to produce an OR'ed output signal; and
a first AND gate connected to said virtual address comparator and said OR gate for carrying out an AND operation on said virtual address coincidence signal and said OR'ed output signal to produce a first AND'ed output signal as said sub-buffer presence/register presence signal;
said second detection means comprising:
an inverter connected to said register and said sub-buffer access address comparators via said OR gate for carrying out an inverting operation on said OR'ed output signal to produce an inverted output signal; and
a second AND gate connected to said virtual address comparator and said inverter for carrying out an AND operation on said virtual address coincidence signal and said inverted output signal to produce a second AND'ed output signal as said buffer presence/sub-buffer absence/register absence signal.

23. An address translation device for translating an input virtual address into an output real address, said device comprising:
a virtual address register for holding said input virtual address as a held virtual address which is divided into first and second fields, said second field being divided into first and second sub-fields;
an address translation buffer having a buffer capacity and a buffer access time and connected to said virtual address register for storing buffer fields of virtual addresses and buffer real addresses corresponding to the respective virtual addresses, each of said buffer fields of the virtual addresses corresponding to said first field of said held virtual address, said address translation buffer being accessed by said second field of said held virtual address as a buffer access address to produce, as an output buffer field of the virtual address and an output buffer real address, one of said buffer fields of said virtual addresses and one of said buffer real addresses, respectively;
a virtual address comparator connected to said virtual address register and said address translation buffer for comparing said first field of the held virtual address with said output buffer field of the virtual address, said virtual address comparator producing a virtual address coincidence signal when said first field of the held virtual address coincides with said output buffer field of the virtual address;
an access/real address register having a register capacity smaller than said buffer capacity and a register access time shorter than said buffer access time, and connected to said virtual address register and said address translation buffer for holding, in response to a buffer presence/sub-buffer absence/register absence signal, said buffer access address and said output buffer real address as a held access address and a held real address, respectively, said held access address being divided into first and second held access sub-addresses, said access/real address register producing said held access address and said held real address as an output register access address and an output register real address, respectively, said access/real address register producing said first and said second held access sub-addresses as first and second output register access sub-addresses, respectively;
a register access address comparator connected to said virtual address register and said access/real address register for comparing said buffer access address with said output register access address, said first access address comparator producing a register access address coincidence signal when said buffer access address coincides with said output register access address;
an access address selector connected to said virtual address register and said access/real address register for selecting, in response to said buffer presence/sub-buffer absence/register absence signal, one of said second sub-field of the held virtual address and said second output register access sub-address as a sub-buffer access address;
an access/real address sub-buffer having a sub-buffer capacity smaller than said buffer capacity and a sub-buffer access time shorter than said buffer access time, and connected to said virtual address register, said access/real address register, and said access address selector for storing, in response to said buffer presence/sub-buffer absence/register absence signal, said first output register access sub-address and said output register real address in said sub-buffer access address as a stored access sub-address and a stored sub-buffer real address, respectively, said access/real address sub-buffer being accessed by said sub-buffer access address to produce, as an output sub-buffer access address and an output sub-buffer real address, the stored access sub-address and the stored sub-buffer real address, respectively;
a sub-buffer access address comparator connected to said virtual address register and said access/real address sub-buffer for comparing said first sub-field of the held virtual address with said output sub-buffer access address, said sub-buffer access address comparator producing a sub-buffer access address coincidence signal when said first sub-field of the held virtual address coincides with said output sub-buffer access address;
a real address selector connected to said access/real address sub-buffer, said access/real address register, and said sub-buffer access address comparator for selecting, in response to said sub-buffer access address coincidence signal, one of said output sub-buffer real address and said output register real address as said output real address;
first detection means connected to said virtual address comparator and said register and said sub-buffer access address comparators for detecting, in response to said virtual address coincidence signal and said register and said sub-buffer access address coincidence signals, that either the stored sub-buffer real address corresponding to said input virtual address is present in said access/real address sub-buffer or the held real address corresponding to said input virtual address is present in said access/real address register, said first detection means producing a sub-buffer presence/register presence signal indicative of either presence in said access/real address sub-buffer or presence in said access/real address register when said virtual address coincidence signal is supplied thereto and when at least one of said register and said sub-buffer access address coincidence signals is supplied thereto; and second detection means connected to said virtual address comparator, said register and said sub-buffer access address comparators, said access/real address register, said access/real address sub-buffer, and said access address selector for detecting, in response to said virtual address coincidence signal and said register and said sub-buffer access address coincidence signals, that the buffer real address corresponding to said input virtual address is present in said address translation buffer and that both of the stored sub-buffer real address and said held real address corresponding to said input virtual address are absent in both of said access/real address register and said access/real address sub-buffer, said second detection means producing said buffer presence/sub-buffer absence/register absence signal indicative of presence in said address translation buffer and of absence in both of said access/real address sub-buffer and said access/real address register when said virtual address coincidence signal is supplied thereto and when both of said register and said sub-buffer access address coincidence signals are not supplied thereto, thereby making said access address selector select said second output register access sub-address as said sub-buffer access address in response to said buffer presence/sub-buffer absence/register absence signal, making said access/real address sub-buffer store said first output register access sub-address and said output register real address in said sub-buffer access address in response to said buffer presence/sub-buffer absence/register absence signal, and making said access/real address register hold said buffer access address and said output buffer real address in response to said buffer presence/sub-buffer absence/register absence signal.

24. An address translation device as claimed in claim 23, wherein said real address selector selects said output sub-buffer real address as said output real address when said sub-buffer access address coincidence signal is supplied thereto, said real address selector selecting said output register real address as said output real address when said sub-buffer access address coincidence signal is not supplied thereto.

25. An address translation device as claimed in claim 23, wherein said access address selector selects said second sub-field of the held virtual address as said sub-buffer access address when said buffer presence/sub-buffer absence/register absence signal is not supplied thereto, said access address selector selecting said second output register access sub-address as said sub-buffer access address when said buffer presence/sub-buffer absence/register absence signal is supplied thereto.

26. An address translation device as claimed in claim 23, wherein said first detection means comprises an OR gate connected to said register and said sub-buffer access address comparators for carrying out an OR operation on said register and said sub-buffer access address coincidence signals to produce an OR'ed output signal and an AND gate connected to said virtual address comparator and said OR gate for carrying out an AND operation on said virtual address coincidence signal and said OR'ed output signal to produce an AND'ed output signal as said sub-buffer presence signal.

27. An address translation device as claimed in claim 23, wherein said second detection means comprises a NOR gate connected to said register and said sub-buffer access address comparators for carrying out a NOR operation on said register and said sub-buffer access address coincidence signals to produce a NOR'ed output signal and an AND gate connected to said virtual address comparator and said NOR gate for carrying out an AND operation on said virtual address coincidence signal and said NOR'ed output signal to produce an AND'ed output signal as said buffer presence/sub-buffer absence/register absence signal.

28. An address translation device as claimed in claim 23, wherein said first detection means comprises:
an OR gate connected to said register and said sub-buffer access address comparators for carrying out an OR operation on said register and said sub-buffer access address coincidence signals to produce an OR'ed output signal; and
a first AND gate connected to said virtual address comparator and said OR gate for carrying out an AND operation on said virtual address coincidence signal and said OR'ed output signal to produce a first AND'ed output signal as said sub-buffer presence/register presence signal;
said second detection means comprising:
an inverter connected to said register and said sub-buffer access address comparators via said OR gate for carrying out an inverting operation on said OR'ed output signal to produce an inverted output signal to produce an inverted output signal; and
a second AND gate connected to said virtual address comparator and said inverter for carrying out an AND operation on said virtual address coincidence signal and said inverted output signal to produce a second AND'ed output signal as said buffer presence/sub-buffer absence/register absence signal.

* * * * *